United States Patent [19]

Wachs

[11] 4,342,415

[45] Aug. 3, 1982

[54] PROTECTIVE DEVICE FOR ELECTRIC COMPONENT WHICH CAN BE SOLDERED INTO A PRINTED BOARD BY MEANS OF A SOLDER BATH

[75] Inventor: Walter Wachs, Krailling, Fed. Rep. of Germany

[73] Assignee: Siemens Aktiengesellschaft, Berlin & Munich, Fed. Rep. of Germany

[21] Appl. No.: 105,948

[22] Filed: Dec. 20, 1979

[30] Foreign Application Priority Data

May 15, 1979 [DE] Fed. Rep. of Germany ....... 7914017

[51] Int. Cl.[3] .............................................. B23K 1/08

[52] U.S. Cl. ........................................ 228/39; 228/59; 228/215; 339/275 B

[58] Field of Search ................. 228/39, 59, 57, 180 R, 228/215, 216; 339/275 B

[56] References Cited

U.S. PATENT DOCUMENTS 2,909,833 10/1959 Murray et al. ........... 339/275 B UX
3,065,524 11/1962 Donnell et al. ................. 228/180 X
3,339,008 8/1967 MacArthur et al. ........... 228/215 X
3,610,811 10/1971 O'Keefe .......................... 228/215 X
4,050,621 9/1977 Bouley ............................ 228/180 R

*Primary Examiner*—Howard N. Goldberg
*Attorney, Agent, or Firm*—Hill, Van Santen, Steadman, Chiara & Simpson

[57] ABSTRACT

A component protective system is disclosed for an electrical component which can be soldered in a printed circuit board by means of a solder bath. A portion of the components which projects through the printed board is protected from the influence of the solder bath by use of a protective collar arranged around the portion to be protected. The protective collar is open in a direction toward the solder bath and projects beyond the portion to be protected. Upon immersion of the component together with the printed circuit board into a solder bath, an air cushion is formed within the protective collar. This air cushion prevents contact between the solder and the portion to be protected and forms a heat insulator which protects this portion from heat damage.

7 Claims, 1 Drawing Figure

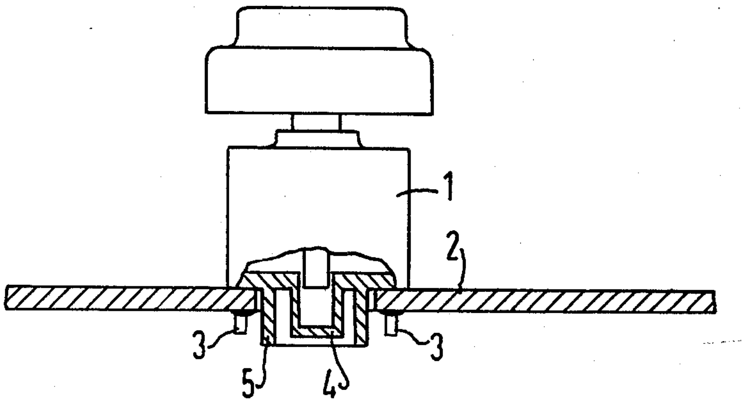
1
2
3
3
5
4

PROTECTIVE DEVICE FOR ELECTRIC COMPONENT WHICH CAN BE SOLDERED INTO A PRINTED BOARD BY MEANS OF A SOLDER BATH

BACKGROUND OF THE INVENTION

The invention relates to a protective device for an electronic component which can be soldered into a printed board by means of a solder bath. A portion of the component projecting through the printed board has an area to be protected against influences due to the solder bath.

It is known to solder electric components such as, for example, resistors, capacitors, relays or push-button keys into printed boards by employment of a solder bath. In case the components have a great insertion height, it is conceivable to allow these to partially project through the printed board and thus to arrange them in countersunk fashion in the printed board. In order to prevent damage to the parts projecting through the printed board due to the influence of heat or due to contamination as a result of the solder bath, the solder operation on the parts projecting through the printed board must be limited to a very short time, particularly when synthetics are used. In case this is not possible, the components must be soldered in by hand.

SUMMARY OF THE INVENTION

An object of the invention is to provide a protective device which protects electric components being soldered into a printed board with a solder bath from influence due to the solder bath.

According to the invention, the object is achieved by providing a protective collar which is arranged around the area or location on the component to be protected, said protective collar being open in the direction toward the solder bath and projecting beyond the location to be protected.

The protective device according to the invention has the advantage that it protects the component in a simple manner from the influence of heat or contamination due to the solder. The protective collar requires minimum expense and can be manufactured in a simple manner, for example, at the same time as the base plate of a component. Preferably the protective collar is arranged at a predetermined distance from the location to be protected so that warping or damage to the protective collar has no influence on the function of the component.

The protective device can be manufactured in a simple manner particularly when the protective collar is arranged on the component in the form of a ring around the location to be protected. In particular, it is advantageous when the protective collar consists of synthetic and is molded onto the component.

In case the protective device is manufactured simultaneously with a portion of the component, it is favorable that the protective collar be permanently connected to the component. It is also possible to design the protective device in such manner that the protective collar can be releasably connected to the component. In this case, for example, the protective collar can be removed after the soldering operation.

The protective device is particularly employed in an advantageous manner when a push-button type key of a keyboard with a low overall height is provided as the component.

BRIEF DESCRIPTION OF THE DRAWING

The drawing figure shows a cross section of a key of a keyboard arranged in a printed board.

DESCRIPTION OF THE PREFERRED EMBODIMENTS

The key 1 (push-button key) illustrated in the Figure is inserted as an electric component in a printed circuit board 2. The key 1 has solder terminals 3 which project through the printed board 2 and which are to be soldered to paths on the underside of the printed circuit board 2.

A slide guide for the sliding portion of the key is molded onto the synthetic housing of the key 1. This slide guide, like the solder terminals 3, projects through the printed board. A protective collar 5 open toward the solder bath is molded onto the synthetic housing of the key 1 around the slide guide 4. With the assistance of this protective device designed as a protective collar 5, one prevents the slide guide 4 from becoming deformed upon immersion of the key 1 together with the printed board 2 into a drag of immersion type solder bath due to the influence of heat and, thus, the guidance function is prejudiced.

When the key 1 together with the printed board 2 is immersed into the solder bath, an air cushion is formed in the hollow space between the slide guide 4 and the protective collar 5, which air cushion prevents the penetration of the solder into the hollow space formed by means of the protective collar 5 and functions as a heat insulator which prevents heat damage to the slide guide 4. Therefore, in order to prevent the solder from penetrating up to the slide guide 4, it is necessary that the protective collar 5 project beyond the slide guide 4. When soldering in an immersion solder bath, the protective collar 5 need only project slightly beyond the location to be protected, namely, the slide guide 4. When soldering in a drag type solder bath, such as for example a flow solder bath, it is necessary that the protective collar 5 project beyond the slide guide 4 to such a degree that the formation of an air cushion is guaranteed. Warping or damage to the protective collar 5 are without significance since it has no influence on the function of the key 1. It is also conceivable to remove the protective collar 5 after the soldering operation. In order to facilitate this removal, the protective collar 5 can be, for example, releasably connected to the key 1.

In the simplest case, the protective collar 5 is annularly arranged around the location to be protected, namely, the slide guide 5. It is also conceivable that it exhibits the form of other geometrical shapes. Preferably it is formed of the same material as the underside of the component employed.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A component protective system, comprising: an electronic component designed for soldering into a printed circuit board by means of a solder bath; a portion of the component projecting through the printed board when the component is mounted; and means for protecting said portion from the influence of the solder bath, said means including a protective collar arranged on the component around the portion to be protected, and said protective collar being open in a direction toward the solder bath and projecting beyond the portion to be protected.

2. A component protective system according to claim 1 wherein the protective collar is annularly arranged on the component around the portion to be protected.

3. A component protective system according to claim 1 wherein the protective collar comprises a synthetic material molded onto the component.

4. A component protective system according to claim 1 wherein the protective collar is permanently connected to the component.

5. A component protective system according to claim 1 wherein the component comprises a key of a keyboard with a low overall relative height.

6. A system according to claim 5 wherein said portion to be protected comprises a guide for receiving a sliding portion of the key.

7. A component protective system, comprising: an electric component designed for soldering into a printed circuit board by means of a solder bath; a portion of the component projecting through an aperture in the printed circuit board when the component is mounted; means for protecting said portion from the influence of the solder bath; and said means comprising a protective collar on the component and surrounding said portion to be protected, said collar being opened in a direction toward the solder bath and extending beyond the portion to be protected so as to create a chamber filled with air which substantially prevents entry of hot vapors and solder from the solder bath.

* * * * *